(12) United States Patent
Childers et al.

(10) Patent No.: US 8,630,515 B2
(45) Date of Patent: Jan. 14, 2014

(54) ROTATED SINGLE OR MULTICORE OPTICAL FIBER

(75) Inventors: Brooks A. Childers, Christiansburg, VA (US); Daniel Homa, Blacksburg, VA (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 13/589,653

(22) Filed: Aug. 20, 2012

(65) Prior Publication Data

US 2012/0314988 A1  Dec. 13, 2012

Related U.S. Application Data

(63) Continuation of application No. 12/613,881, filed on Nov. 6, 2009, now Pat. No. 8,265,431.

(51) Int. Cl.
*G02B 6/00* (2006.01)

(52) U.S. Cl.
USPC .............................................. 385/13; 385/12

(58) Field of Classification Search
None
See application file for complete search history.

(56) References Cited

U.S. PATENT DOCUMENTS

| | | | |
|---|---|---|---|
| 4,295,738 A | 10/1981 | Meltz et al. |
| 4,308,045 A | 12/1981 | Miller |
| 4,397,524 A | 8/1983 | Yoshimura et al. |
| 4,443,698 A | 4/1984 | Schiffner |
| 4,473,273 A | 9/1984 | Hodge |
| 4,729,777 A | 3/1988 | Mimura et al. |
| 4,842,627 A | 6/1989 | Schneider et al. |
| 5,160,521 A | 11/1992 | Tran |
| 5,285,518 A | 2/1994 | Elyamani et al. |
| 5,560,759 A | 10/1996 | Kortan et al. |
| 5,581,647 A | 12/1996 | Onishi et al. |
| 5,656,056 A | 8/1997 | Braglia et al. |
| 5,708,752 A | 1/1998 | Noda et al. |
| 5,788,734 A | 8/1998 | Hoshino et al. |
| 5,790,735 A | 8/1998 | Oleskevich et al. |
| 5,796,903 A | 8/1998 | Tran |
| 5,850,497 A | 12/1998 | Fleming et al. |
| 6,256,090 B1 | 7/2001 | Chen et al. |
| 6,408,652 B1 | 6/2002 | Okamura et al. |
| 6,821,917 B2 | 11/2004 | Taylor et al. |

(Continued)

FOREIGN PATENT DOCUMENTS

| | | |
|---|---|---|
| EP | 0482348 A2 | 4/1992 |
| EP | 0698582 A2 | 2/1996 |

(Continued)

OTHER PUBLICATIONS

Gander et al., "Bend measurement using Bragg gratings in multicore fibre", Electronic Letters, Jan. 20, 2000, vol. 36, No. 2, pp. 120-121.

(Continued)

*Primary Examiner* — Mike Stahl
(74) *Attorney, Agent, or Firm* — Cantor Colburn LLP

(57) ABSTRACT

An apparatus for estimating a shape, the apparatus including: an optical fiber configured to conform to the shape and having a first core offset from a centerline of the optical fiber, the first core having an optical characteristic configured to change due to a change in shape of the optical fiber wherein a change in the optical characteristic is used to estimate the shape. A method for estimating a shape is also disclosed.

15 Claims, 3 Drawing Sheets

(56) References Cited

U.S. PATENT DOCUMENTS

| | | |
|---|---|---|
| 6,888,623 B2 | 5/2005 | Clements |
| 7,290,408 B1 | 11/2007 | Humbert et al. |
| 7,324,714 B1 | 1/2008 | Cranch et al. |
| 7,720,322 B2 | 5/2010 | Prisco |
| 2002/0078714 A1 | 6/2002 | Bird et al. |
| 2003/0174924 A1 | 9/2003 | Tenyson |
| 2004/0107734 A1 | 6/2004 | Kenkare et al. |
| 2006/0045408 A1 | 3/2006 | Jones et al. |
| 2007/0065077 A1 | 3/2007 | Childers et al. |
| 2007/0156019 A1 | 7/2007 | Larkin et al. |
| 2007/0201793 A1 | 8/2007 | Askins et al. |
| 2007/0297712 A1 | 12/2007 | Meneghini et al. |
| 2009/0116000 A1 | 5/2009 | Kiddy et al. |
| 2011/0109898 A1* | 5/2011 | Froggatt et al. ............. 356/73.1 |
| 2013/0094798 A1* | 4/2013 | Duncan et al. ................. 385/13 |

FOREIGN PATENT DOCUMENTS

| | | |
|---|---|---|
| EP | 0940373 A2 | 9/1999 |
| GB | 2071644 A | 9/1981 |
| JP | 6136134 A | 2/1986 |
| JP | 1201045 A1 | 8/1989 |

OTHER PUBLICATIONS

International Search Report and Written Opinion for PCT Application No. PCT/US2010/055288, dated Jun. 13, 2011, pp. 1-10.

* cited by examiner fiber Bragg gratings (FBGs) 6 having nominal first reflection wavelength offset from centerline of optical fiber 4

FIG. 2A
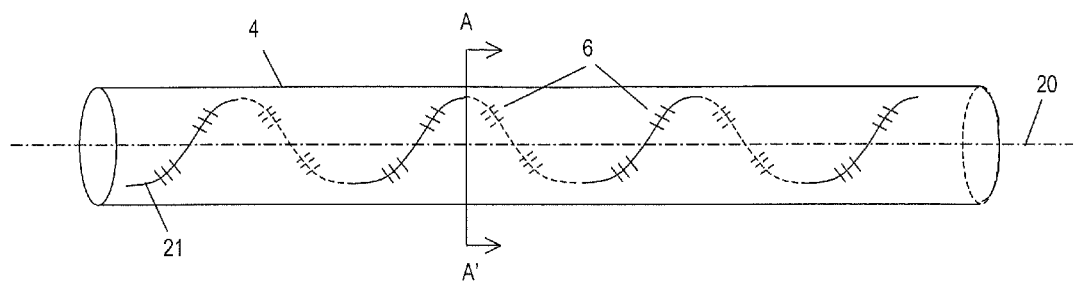
FIG. 2B
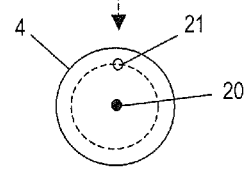
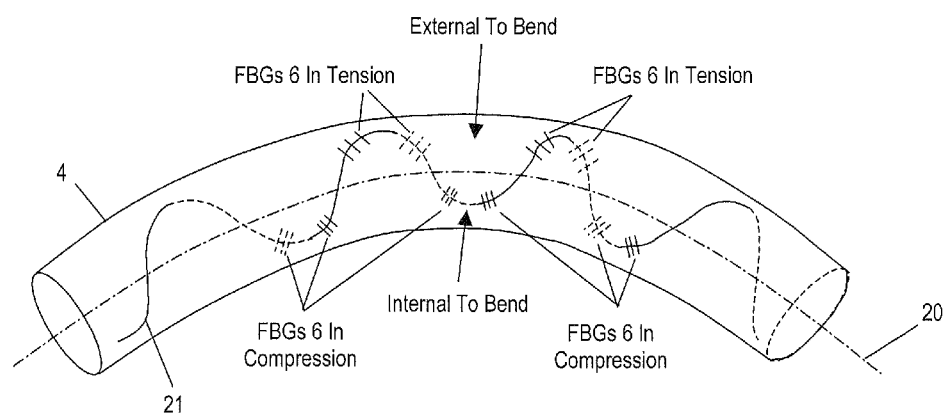
FIG. 2C

ROTATED SINGLE OR MULTICORE OPTICAL FIBER

CROSS REFERENCE TO RELATED APPLICATION

This is a continuation application of U.S. application Ser. No. 12/613,881, filed Nov. 6, 2009, the disclosure of which is incorporated by reference herein in its entirety.

BACKGROUND OF THE INVENTION

1. Field of the Invention

The present invention relates to measuring a shape. More particularly, the measuring is performed in a borehole penetrating the earth.

2. Description of the Related Art

In exploration and production of hydrocarbons, it is often necessary to drill a borehole into the earth to gain access to the hydrocarbons. Equipment and structures, such as borehole casings for example, are generally disposed into a borehole as part of the exploration and production. Unfortunately, the environment presented deep into the borehole can place extreme demands upon the equipment and structures disposed therein. For example, the equipment and structures can be exposed to high temperatures, pressures, and forces that can deform their shape and, thus, their operation and longevity.

In order to monitor the health of the components disposed downhole, a conventional distributed strain sensing system (DSSS) may be used. DSSS sensors may be attached to a component at various locations usually at different depths in the borehole. The sensors can measure the strain imposed upon the component. From the strain measurements, it can be determined if the component is being deformed.

In one class of DSSSs known as optical reflectometry systems, a linear series of fiber Bragg gratings is etched into an optical fiber. Each fiber Bragg grating (FBG) in the series acts as a strain sensor. The optical fiber, in one example, is continuously and rigidly attached to a borehole casing and wrapped around the casing for a certain longitudinal length. Because the optical fiber is continuously and rigidly attached to the casing, any strain experienced by the casing will also be experienced by the optical fiber. As each FBG is exposed to a strain, the dimensions and, thus, the optical characteristics of each FBG will also change in relation to the strain. For example, a tension experienced by the casing will be experienced by the FBG. Conversely, a compression experienced by the casing will also be experienced by the FBG. The strain is typically measured from baseline data obtained with the component not experiencing a strain. A beam of light reflected from the optical fiber is used to interrogate each of the FBGs to obtain their strain measurements.

Operations for producing hydrocarbons can be very expensive. Hence, production operators strive to minimize the time is takes to deploy components downhole. Unfortunately, it can take a significant amount of time to continuously and rigidly attach the optical fiber in the conventional DSSS to the component to be deployed downhole. In one example, the optical fiber is secured to the component with epoxy, which takes significant time to apply and cure.

Therefore, what are needed are techniques to determine a change in shape or deformation of a component, particularly, if the component is going to be deployed downhole.

BRIEF SUMMARY OF THE INVENTION

Disclosed is a an apparatus for estimating a shape, the apparatus including: an optical fiber configured to conform to the shape and having a first core offset from a centerline of the optical fiber, the first core having an optical characteristic configured to change due to a change in shape of the optical fiber wherein a change in the optical characteristic is used to estimate the shape.

Also disclosed is a method for estimating a shape, the method including: illuminating an optical fiber configured to conform to the shape and having a first core offset from a centerline of the optical fiber, the first core having an optical characteristic configured to change due to a change in shape of the optical fiber; and receiving light signals resulting from the illumination to estimate the shape; wherein the light signals include information related to a change in the optical characteristic.

Further disclosed is a non-transitory computer-readable medium having computer-executable instructions for estimating a shape by implementing a method including: illuminating an optical fiber configured to conform to the shape and having a first core offset from a centerline of the optical fiber, the first core having an optical characteristic configured to change due to a change in shape of the optical fiber; and receiving light signals resulting from the illumination to estimate the shape; wherein the light signals include information related to a change in the optical characteristic.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

FIGS. 2A, 2B, and 2C, collectively referred to as FIG. 2, depict aspects of an optical fiber having a series of fiber Bragg gratings used in the OSSS.

DETAILED DESCRIPTION OF THE INVENTION

Disclosed are embodiments of techniques for determining a change in shape or a deformation of a component without requiring a shape-sensing system to be attached continuously and rigidly to the component. That is the shape-sensing system does not require that the strain experienced by a component that causes its shape to change also be experienced by the shape-sensing system.

The techniques, which include apparatus and method, call for a shape-sensing system based on optical reflectometry. The shape-sensing system includes an optical fiber as a shape sensor. To sense a shape, the optical fiber includes a light-guiding core, which can have a series of fiber Bragg gratings (FBGs). The optical fiber has a generally circular shaped cross-section with a geometric centerline such that when the optical fiber bends the portion of the fiber internal to the bend experiences compression and the portion of the fiber external to the bend experiences tension. In order for the FBGs to experience the compression and the tension, the light-guiding core is disposed offset from the center of the fiber.

In one embodiment, the light-guiding core is situated in a spiral shape about the centerline of the optical fiber with the FBGs experiencing compression or tension in the vicinity of the bend. Thus, the centerline of the fiber may be visualized as the shape being sensed.

Before the techniques are discussed in detail, certain definitions are presented. The term "fiber Bragg grating" (FBG) relates to an optical fiber having a periodic variation of the refractive index of the fiber core resulting in a wavelength specific dielectric mirror. The FBG acts as a wavelength-specific reflector having a reflection frequency or wavelength. As the FBG undergoes compression or tension, the periodic variation to the refractive index changes causing a shift in the reflection wavelength. The shift may then be correlated to a specific bend experienced by the optical fiber. Accordingly, a sum of the specific bends experienced by the optical fiber may be correlated to a change in shape experienced by the optical fiber. The term "nominal reflection wavelength" relates to the wavelength at which each FBG is designed to reflect light recognizing that manufacturing imperfections may cause the actual wavelength to vary slightly from the design wavelength. The term "core" relates to a light guiding path within an optical fiber. The term "offset" relates to the light-guiding core not being superimposed upon a centerline of the optical fiber. The term "non-rigidly" relates to the shape sensing optical fiber being attached to a component such that a strain experienced by the component is not imposed upon the shape sensing optical fiber.

Figure 1:
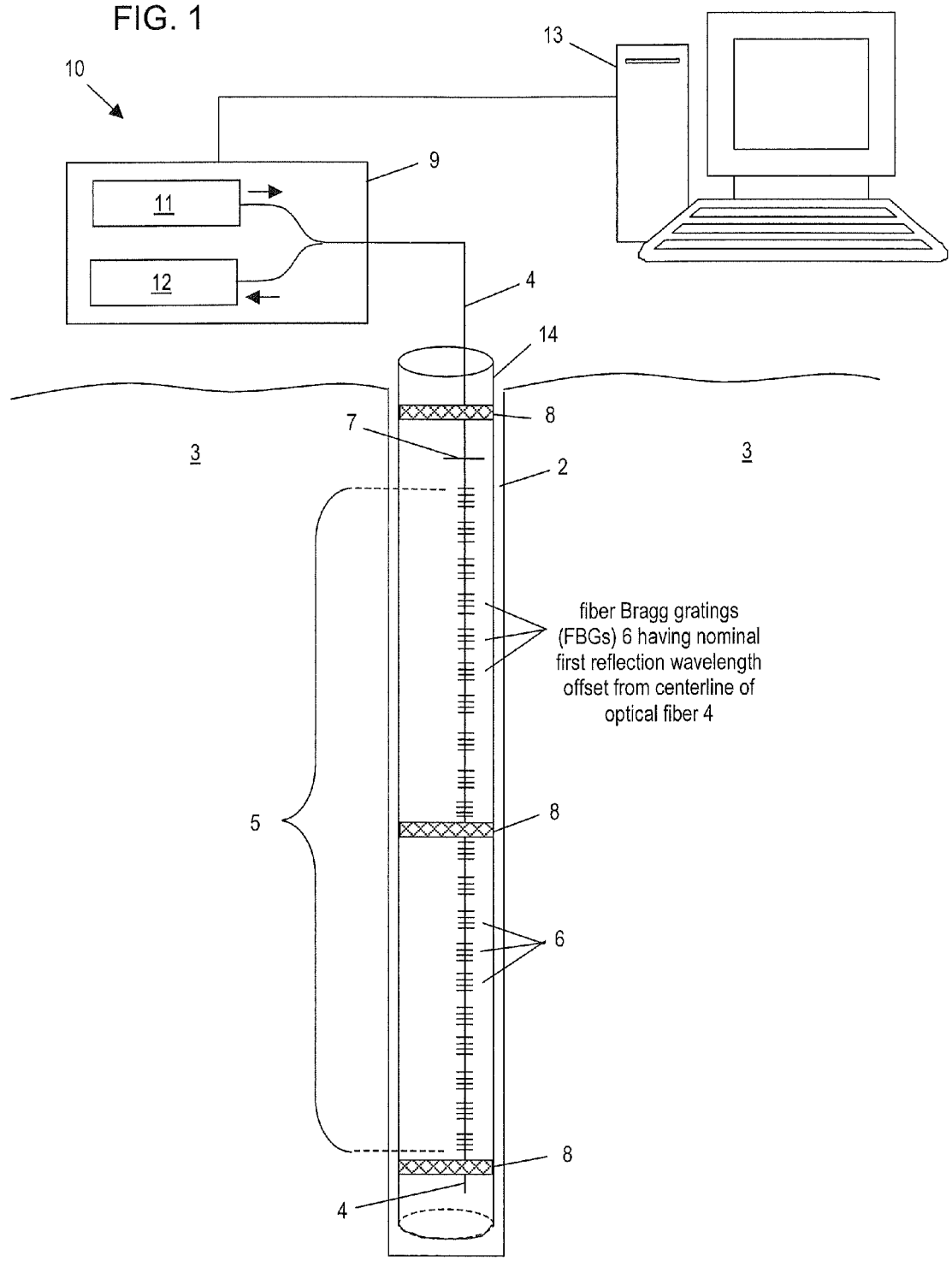
FIG. 1 illustrates an exemplary embodiment of an optical shape sensing system (OSSS) configured to estimate a shape.

Reference may now be had to FIG. 1. FIG. 1 illustrates an exemplary embodiment of an optical shape-sensing system 10 (OSSS 10) configured to sense a shape of a casing 14 lining a borehole 2 penetrating the earth 3. The casing 14 generally is used for hydrocarbon production purposes, but may represent any equipment, structure, or geologic feature that may be sensed for shape by the OSSS 10. The OSSS 10 includes an optical fiber 4 having a series 5 of FBGs 6 with each FBG 6 having the same nominal reflection wavelength. The series 5 of FBGs 6 are situated towards the distal end of the optical fiber 4 with respect to a reference reflector 7. The reference reflector 7 is configured to form an optical interferometric cavity, such as a Fabry-Perot cavity, with each FBG 6 in the series 5. In that the reference reflector 7 must pass and reflect light, the reference reflector 7 is a partial reflector. In other embodiments, the reference reflector 7 may not be required.

Still referring to FIG. 1, the optical fiber 4 is non-rigidly coupled to the casing 14 along spatial intervals using attachment devices 8, which in one embodiment can be straps. The attachment devices 8 are configured to secure the optical fiber 4 to the casing 14 so that the optical fiber 4 assumes the shape of the casing 14. However, the attachment devices 8 do not have to be configured to transfer a strain experienced by the casing 14 to the optical fiber 4 because the shape of the optical fiber 4 itself is being measured. If the shape of the optical fiber 4 does not change then the FBGs 6 will not experience a change in compression or tension from when the optical fiber 4 was secured to the casing 14. Accordingly, the FBGs 6 experiencing a change in compression or tension indicate that the shape of the optical fiber 4 has changed from when the optical fiber was secured to the casing 14.

Still referring to FIG. 1, the OSSS 10 includes an optical interrogator 9. The optical interrogator 9 is configured to obtain shape-sensing data from each individual FBG 6 in the optical fiber 4. To obtain the data, the optical interrogator 9 includes a light source 11 such as a tunable laser and a photodetector 12. The light source 11 is configured to illuminate the optical fiber 4 with wavelengths of light swept about the nominal reflection wavelength λ.

In a technique referred to as Optical Frequency Domain Reflectometry, the swept wavelengths of light illuminating the optical fiber 4 create an interferogram from the various interferences of light from the various optical interferometric cavities. The interferogram is a record of the light interferences with each light interference having a reflection wavelength and a magnitude of the reflected light. The photodetector 12 is configured to receive and measure the light reflected from the optical fiber 4 at the various wavelengths and associated magnitudes in order to create the interferogram. The interferogram may be created by the optical interrogator 9 or a computer processing system 13 coupled to the optical interrogator 9.

From the interferogram, shape measurement data from each FBG 6 may be obtained. In general, an interference is associated with each individual FBG 6. The wavelength of the interference identifies the individual FBG 6 and the magnitude of the wavelength of the reflected light at the wavelength is the shape measurement data.

In one embodiment, when all of the interferences are received, the interferences are transformed into a spatial frequency domain using a Fast Fourier Transform. In the spatial frequency domain, each FBG 6 is associated with a frequency that is used to locate that FBG 6 along the optical fiber 4 (i.e., at a space within the optical fiber 4). In general, as the distance from the reference reflector 7 to one FBG 6 increases, the frequency identifying that FBG 6 also increases.

In another embodiment, the shape measurement data can be obtained from each FBG 6 in the series 5 using a technique referred to as Optical Time Domain Reflectometry. In this technique, a series of light pulses are injected into the optical fiber 4. As a result of the injected pulses, light is reflected from each of the FBGs 6 and received by the optical interrogator 9. The strength of the return pulses is measured and integrated as a function time. From this calculation, a record of the strength of the return pulses versus length along the optical fiber 4 is produced. The strength of the return pulses includes the shape measurement data from each of the FBGs 6 and the length identifies each FBG 6.

Once shape sensing data is obtained from the light-guiding core 21 of the optical fiber 4, the data may be assembled or integrated to estimate the shape of the optical fiber 4.

Reference may now be had to FIG. 2. FIG. 2 depicts aspects of the optical fiber 4. Referring to FIG. 2A, a longitudinal side view of the optical fiber 4 is shown. The optical fiber 4 has a centerline 20 about which the optical fiber 4 is configured to bend. Offset from the centerline 20 is a light-guiding core 21. The light-guiding core 21 includes the series 5 of the FBGs 6. In general, the light-guiding core 21 is made by doping the optical fiber 4 with a material or materials that reflect and guide light along the core 21. In the embodiment of FIG. 2, the core 21 is situated within the optical fiber 4 such as to form a spiral about the centerline 20. Referring to FIG. 2B, a cross-sectional view of the optical fiber 4 is shown depicting the offset of the core 21 from the centerline 20. The dashed line is an end view of the path of the core 21. FIG. 2C illustrates a bend in the optical fiber 4. The bend puts at least one FBG 6 internal to the bend into compression and at least one FBG 6 external to the bend into tension. Hence, by assembling the shape-sensing data from each of the FBGs 6 in the series 5, the shape of the optical fiber 4 can be estimated.

In general, the resolution or sensitivity of the OSSS 10 may be increased by increasing the number of turns of the core 21 per unit length of the optical fiber 4. In addition, the resolution or sensitivity may be changed by changing the outer diameter of the optical fiber 4 and/or the location of the core 21 within the optical fiber 4.

While the embodiment of FIG. 2 depicts the optical fiber 4 with one light-guiding core 21, one or more additional light guiding cores 21 offset from the centerline 20 may also be included in the optical fiber 4. In embodiments having more than one light-guiding core 21, the cores 21 may be used to provide redundant measurements to validate the shape-sensing data.

While the embodiment of FIG. 2 depicts the core 21 with a spiral shape, the spiral shape is a non-limiting example of any shape that may have at least one FBG 6 in compression internal to a bend of the optical fiber 4 and/or at least one FBG 6 in tension external to the bend. In one example, the core 21 can intersect the centerline 20 at one point, proceed towards the outside of the optical fiber 4 and then turn and intersect the centerline 20 at another point. Thus, the core 21 may intersect the centerline 20 at a series of points spaced apart from one another.

In one embodiment, the spiral shape of the core 21 as depicted in FIG. 2 can be produced by rotating a single core or multi-core preform that is offset from the centerline 20 during online fabrication of the optical fiber 4.

In the embodiment discussed above, the core 21 offset from the centerline 20 includes the series 5 of FBGs 6 that provide an optical characteristic that changes with a change to the shape of the optical fiber 4. In another embodiment, the core 21 while still offset from the centerline 20 may include continuous periodic changes in the refractive index (i.e., one continuous series of gratings with no periodic gap) in lieu of the series 5 of FBGs 6. In another embodiment, the core 21 while still offset from the centerline 20 may not include any gratings. In this embodiment, the techniques rely on the core 21 experiencing compression internal to a bend or tension external to a bend to provide the change in an optical characteristic (e.g., index of refraction) due to a change in shape of the optical fiber 4. Shape sensing data can be obtained from the core 21 with no gratings by using optical frequency domain reflectometry to detect and measure Rayleigh scattering or by detecting and measuring Brillouin scattering.

Figure 3:
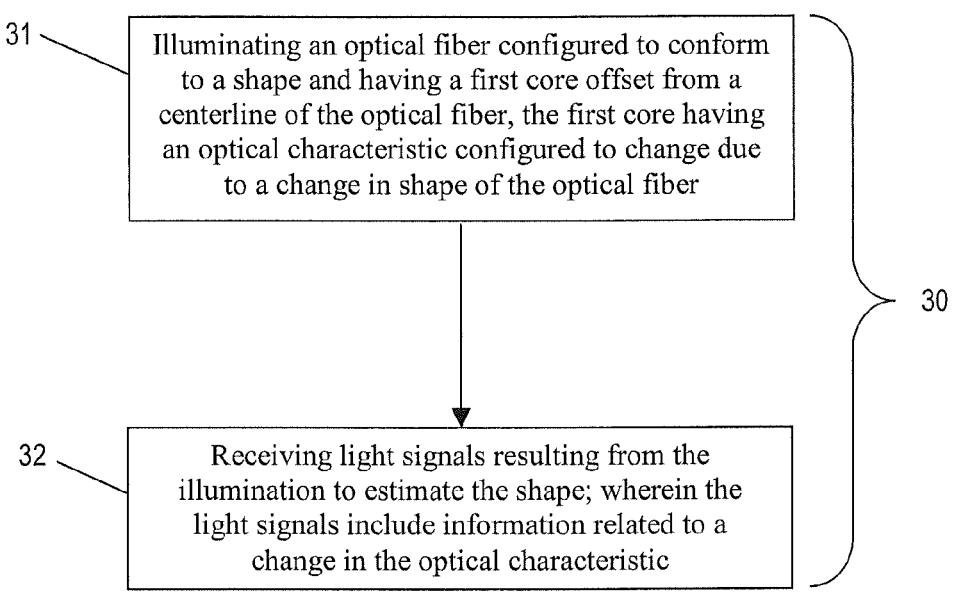
FIG. 3 presents one example of a method for estimating a shape.

FIG. 3 presents one example of a method 30 for estimating a shape. The method 30 calls for (step 31) illuminating the optical fiber 4. Further, the method 30 calls for (step 32) receiving light signals resulting from the illumination to estimate the shape. In one embodiment, the optical fiber 4 includes the series 5 of the FBGs 6 and the light signals include light interferences resulting from the illumination of the FBGs 6. The light interferences include information related to a change in the spacing of gratings in the FBGs 6 due to at least one of compression and tension of the FBGs 6 resulting from a change in the shape of the optical fiber 4.

In support of the teachings herein, various analysis components may be used, including a digital and/or an analog system. For example, the optical interrogator 9 or the processing system 13 may include the digital and/or analog system. The system may have components such as a processor, storage media, memory, input, output, communications link (wired, wireless, pulsed mud, optical or other), user interfaces (such as a keyboard, mouse, display or printer), software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), magnet, electromagnet, sensor, electrode, transmitter, receiver, transceiver, antenna, controller, optical coupler, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for estimating a shape of a structure, the apparatus comprising:
an optical fiber comprising a first core forming a spiral about a centerline of the optical fiber, the optical fiber configured to conform to the shape of the structure, a change in shape of the optical fiber causing a change in an optical characteristic of the first core such that the change in the optical characteristic of only the first core is used to determine an estimate of the shape.

2. The apparatus according to claim 1, further comprising an optical interrogator configured to illuminate the optical fiber and receive reflected light from the optical fiber, the reflected light indicating the change in the optical characteristic of the first core; and a processor configured to determine the estimate of the shape of the structure based on the reflected light.

3. The apparatus according to claim 2, wherein the optical interrogator is further configured to obtain shape sensing data from the first core by at least one of detecting Rayleigh scattering with Optical Frequency Domain Reflectometry (OFDR) or detecting Brillouin scattering.

4. The apparatus according to claim 1, wherein a number of turns of the first core forming the spiral for a given length of the optical fiber affects a resolution of the estimate.

5. The apparatus according to claim 4, wherein the resolution of the estimate increases as the number of turns of the first core increases.

6. The apparatus according to claim 1, wherein when the optical fiber experiences a bend, the change in the optical characteristic of the first core is caused by the first core experiencing compression internal to the bend or tension external to the bend.

7. The apparatus according to claim 1, wherein the first core includes a series of fiber Bragg gratings (FBGs).

8. The apparatus according to claim 7, wherein when the optical fiber experiences a bend, the change in the optical characteristic of the first core is caused by an FBG of the series of FBGs internal to the bend being put into compression and an FBG of the series of FBGs external to the bend being put into tension.

9. The apparatus of claim 7, wherein the optical fiber further comprises a second core offset from the centerline, the second core comprising another series of FBGs, and when the optical fiber experiences a bend, a change in an optical characteristic of the second core, used to determine a second estimate of the shape, is caused by an FBG of the another series of FBGs internal to the bend being put into compression and an FBG of the another series of FBGs external to the bend being put into tension.

10. The apparatus of claim 9, wherein the second estimate of the shape based on the second core is used to validate the estimate of the shape based on the first core.

11. A method of estimating a shape of a structure, the method comprising:
   attaching, to the structure, an optical fiber comprising a first core forming a spiral about a centerline of the optical fiber, the first core configured such that a change in shape of the optical fiber causes a change in an optical characteristic of the first core;
   illuminating the optical fiber; and
   receiving reflected light resulting from the illuminating, the reflected light indicating the change in the optical characteristic of the first core; and
   estimating the shape based on the reflected light indicating the change in the optical characteristic of only the first core.

12. The method according to claim 11, further comprising forming the first core with a series of fiber Bragg gratings (FBGs).

13. The method according to claim 12, wherein when the optical fiber experiences a bend, the change in the optical characteristic of the first core is caused by an FBG of the series of FBGs internal to the bend being put into compression and an FBG of the series of FBGs external to the bend being put into tension.

14. The method according to claim 12, further comprising validating the estimate with a second estimate.

15. The method according to claim 14, further comprising determining the second estimate based on a second core offset from the centerline, the second core comprising another series of FBGs, wherein when the optical fiber experiences a bend, a change in an optical characteristic of the second core, used for determining the second estimate of the shape, is caused by an FBG of the another series of FBGs internal to the bend being put into compression and an FBG of the another series of FBGs external to the bend being put into tension.

* * * * *